United States Patent
Konrad et al.

(10) Patent No.: US 6,406,810 B1
(45) Date of Patent: Jun. 18, 2002

(54) FUEL CELL SYSTEM WITH CATHODE-SIDE WATER SEPARATING DEVICES

(75) Inventors: Gerhard Konrad, Ulm; Arnold Lamm, Oberelchingen; Steffen Wieland, Heilbronn, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/524,759

(22) Filed: Mar. 13, 2000

(30) Foreign Application Priority Data

Mar. 12, 1999 (DE) .......................... 199 11 016

(51) Int. Cl.$^7$ ................................. H01M 4/60
(52) U.S. Cl. ............................. 429/34; 429/12; 429/14; 429/17; 429/19
(58) Field of Search ............................. 429/12, 14, 17, 429/19, 34

(56) References Cited

U.S. PATENT DOCUMENTS

| 4,001,041 A | 1/1977 | Menard |
| 4,729,932 A | 3/1988 | McElroy et al. |
| 4,738,903 A | 4/1988 | Garow et al. |
| 5,432,023 A | 7/1995 | Yamada et al. |
| 5,599,638 A | 2/1997 | Surampudi et al. |
| 5,980,716 A | * 11/1999 | Horinouchi et al. ........ 204/524 |
| 6,117,577 A | * 9/2000 | Wilson ........................ 429/17 |

FOREIGN PATENT DOCUMENTS

| DE | 197 01 560 A1 | 7/1998 |
| WO | WO 94/15377 | 7/1994 |

* cited by examiner

Primary Examiner—Carol Chaney
Assistant Examiner—Dah-Wei D. Yuan
(74) Attorney, Agent, or Firm—Crowell & Moring LLP

(57) ABSTRACT

A fuel cell system includes at least one fuel cell which contains an anode space with an inlet-side anode feed and an outlet-side anode discharge; a cathode space with an inlet-side cathode feed and an outlet-side cathode discharge; and water separating devices arranged in the cathode discharge. According to the invention, the water separating devices contain a water separating membrane unit with a mixture space situated in the cathode discharge and a water collecting space separated therefrom by a water separating membrane.

6 Claims, 1 Drawing Sheet

FUEL CELL SYSTEM WITH CATHODE-SIDE WATER SEPARATING DEVICES

BACKGROUND AND SUMMARY OF THE INVENTION

This application claims the priority of German patent document 199 11 016.6, Filed Mar. 12, 1999, the disclosure of which is expressly incorporated by reference herein.

The invention relates to a fuel cell system of the type that can be used, for example, in fuel-cell-operated motor vehicles. In such devices, a suitable liquid or gaseous fuel mixture, such as a hydrogen-rich gas mixture or a liquid water/methanol mixture, is fed into the anode space of the fuel cell, where the fuel is electrochemically oxidized at the anode, after which the reacted mixture is removed by way of the anode discharge from the anode space. An oxygen-containing gas, such as air, is fed into the cathode space, where the oxygen is reduced at the cathode for forming water, after which the water-containing cathode waste gas is removed by way of the cathode discharge from the cathode space.

In many applications, it is desirable to be able to separate the water contained in the cathode waste gas from the other constituents, for example, to utilize once again in the system the separated water and/or the cathode waste gas purified again with respect to the contained water. For this purpose, water separating devices are arranged in the cathode discharge. Normally, these water separating devices consist of a condenser, in which the water is condensed out at a suitably low temperature, requiring a correspondingly large and voluminous heat transfer device construction for the condenser, in order to sufficiently cool down the cathode waste gas. Frequently, an expander in the form of a turbine coupled with a cathode-feed-side compressor is provided in the cathode discharge; in this case a condenser can be arranged upstream and/or downstream of the expander. Fuel cell systems of this type are described in German Published Patent Application DE 197 01 560 A1 and U.S. Patent Documents U.S. Pat. Nos. 4,001,041, 4,738,903 and 5,599,638.

The system disclosed in the last mentioned document contains a water recovery unit arranged in the cathode discharge, which provides recovered water in liquid form at its water-side outlet. That is, it is designed as a condenser and feeds the liquid water to a fuel injection unit which meters methanol as the fuel into the liquid water and dissolves it therein. The liquid methanol/water mixture is fed to a circulation tank designed as a tower and as a gas/liquid separation unit. For this purpose, it may contain tubes made of a microporous material which are penetrable by gases which are carried along (particularly carbon dioxide which was brought in with the cathode-side water), but are not penetrable by the liquid fuel/water mixture. As an alternative to the use of such microporous tubes, the liquid fuel/water mixture can be fed into the bottom area of the circulation tank, after which the gaseous carbon dioxide will then collect in the upper tank area and can be removed.

From U.S. Pat. No. 5,432,023, it is known to extract the water formed at the cathode of a fuel cell by way of a wick (which contacts the cathode and is made of a porous material), into a water recovery chamber. For this purpose, the wick is produced with a pore diameter which decreases, for example, in two stages, in the direction of the water recovery chamber, with the portion of the wick piece adjoining the cathode having a pore diameter which is smaller than that of the porous cathode material.

In the chemical esterification field, corresponding water separating membranes, usually in the form of polymer membranes, are used for water separation or water supply.

One object of the invention is to provide a fuel cell system of the type described above, which has water separating devices that can be constructed in a comparatively compact manner and permit a satisfactory separation of water contained in the cathode waste gas.

These and other objects and advantages are achieved by the present invention, in which the water separating devices characteristically contain a water separating membrane suitable for the selective water vapor separation. For this purpose, membranes are particularly suitable which are conventionally used in the chemical esterification process technique for the separating of water and for supplying water. Such a water separating membrane typically consists of a polymeric or porous material, for example, ceramics, glass or metal; and, if the pressure difference between the mixture space adjoining on the one membrane side and the water collecting space adjoining on the other membrane side is sufficiently high, it performs a satisfactorily selective water separation from the residual cathode waste gas by means of known membrane-type water separation processes.

Since, for this type of water separation, the temperature does not have to be lowered as far as required for a condensation separation, while the water separation performance of the water separating membrane is the same, it can be built in a significantly more compact and more space-saving manner than the conventionally used condensers. Even if, in addition to the water separating membrane, a condenser is provided, this condenser can be more compact than because it has only to carry out a water separating performance reduced by that of the water separating membrane unit.

In one embodiment of the fuel cell system according to the invention, an expander arranged in the cathode discharge is used for the supporting drive of a compressor arranged in the cathode feed, and contributes to the cooling of the cathode waste gas.

In another embodiment of the invention, the water separated by the water separating membrane unit can be fed back into the anode feed, and thus can be utilized on the anode side. This is expedient, for example, for systems with an anode-side water/methanol liquid circulation system in order to compensate water losses occurring there.

In still another embodiment, the water collecting space of the water separating membrane unit is adjoined by a condenser. Such a two-stage design of the water separating devices permits a particularly efficient water separation. Further, a gas recirculation pipe can be provided, which recirculates residual gas, such as residual air, which has passed through the water separating membrane and reaches the condenser, back into the cathode feed for another utilization.

According to another feature of the invention, the water separating membrane unit and the condenser may be integrated in a common constructional unit, by means of which a high water separating performance can therefore be achieved while the construction is very compact.

Other objects, advantages and novel features of the present invention will become apparent from the following detailed description of the invention when considered in conjunction with the accompanying drawings.

DETAILED DESCRIPTION OF THE DRAWINGS

Figure 1:
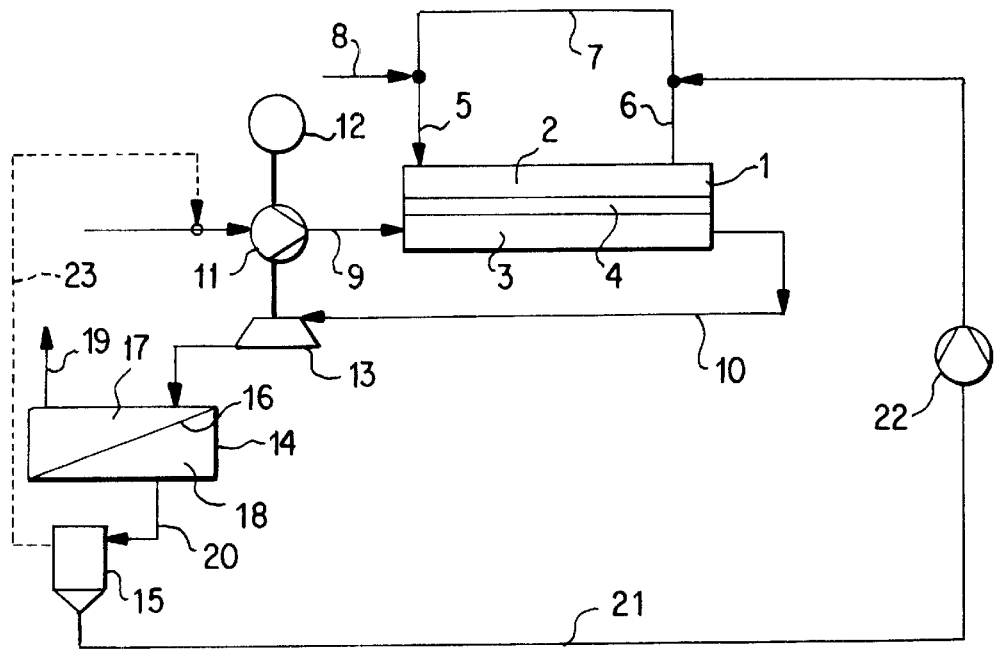
FIG. 1 is a block diagram of a fuel cell system according to the invention, with a water separating membrane unit arranged downstream of an expander.

The fuel cell system illustrated in FIG. 1 comprises a conventional fuel cell 1 with an anode space 2, a cathode space 3 and a proton-conducting fuel cell membrane 4 which separates these two spaces. In a known manner, the membrane has the anode and the cathode on its two sides facing the anode space 2 and the cathode space 3. An anode feed pipe 5 leading into the anode space 2 and an anode discharge pipe 6 leading out of the anode space 2 are connected to form an anode circulation system 7 in which a suitable fuel mixture circulates, such as a liquid water/methanol mixture. By way of a feed pipe 8, the fuel, such as methanol, can be metered into the circulation system 7. By way of a cathode feed pipe 9, an oxygen-containing gas, such as air, is introduced into the cathode space 3. The contained oxygen is reduced at the cathode side of the membrane 4, and the formed oxygen ions combine with the protons, which move through the membrane 4 and are formed by the oxidation of the fuel on the anode side of the membrane 4, to form water. The cathode waste gas which thereby forms from the water vapor and the residual gas is discharged by way of a cathode discharge pipe 10 from the cathode space 3.

For increasing the efficiency, the oxygen containing gas is fed into the cathode space 3 under pressure. For this purpose, a compressor 11 arranged in the cathode feed pipe 9 is driven by an electric motor 12. A portion of the energy required for the compressing of the oxygen-containing gas is recovered by means of an expander 13 arranged in the cathode discharge pipe 10, which expander 13 (for example, as a turbine) is disposed on a common drive shaft, together with the compressor 11 and the electric motor 12.

Downstream of the expander 13, water separating devices are provided in the cathode discharge pipe 10 and are formed in two stages by a water separating membrane unit 14 and a condenser 15 connected on its output side. The water separating membrane unit 14 contains a water separating membrane 16 of a suitable conventional type, which is shown schematically, as well as a mixture space 17 adjoining one membrane side and a water collecting space 18 adjoining the other membrane side. In particular, a polymer membrane or a membrane made of a porous ceramic, glass or metal material can be used as the water separating membrane 16. The cathode waste gas coming from the expander 13 is introduced into the mixture space 17, and the water contained therein flows selectively through the water separating membrane 16 to the water collecting space 18, while the residual cathode waste gas, freed of the water, leaves the mixture space 17 by way of a waste gas exhaust pipe 19.

The water-separating function of the water separating membrane 16 is promoted by providing a sufficient pressure difference between the mixture space 17 and the water collecting space 18. This pressure difference is the result of the effect of the compressor 11 by means of which, in the cathode space 3 (and therefore also in the area of the cathode discharge pipe 10 upstream of the expander 13) typically an excess pressure of several bar (for example, 25 bar) is generated. The operation of the expander 13 is selected such that the excess pressure reduction in the cathode discharge pipe 10 caused by the expander is only so large that an excess pressure of typically only one bar to several bar, for example, 1.5 bar, remains in the mixture space of the water separating membrane unit 14, which is still sufficient for carrying out the water separating function of the respective membrane 16.

The condenser 15 is connected to a water outlet pipe 20 leading out of the water collecting space 18. It completes the water separating function of the water separating membrane unit 14 by condensing out the water vapor, which is selectively separated by the water separating membrane 16, from the residual gas which was possibly entrained through the water separating membrane 16. For this purpose, the water vapor fed to the condenser 15 is appropriately cooled there. Since a considerable portion of the cathode exhaust gas does not pass through the water separating membrane 16, the condenser 15 does not have to cool this gas fraction and, in comparison to systems without a water separating membrane unit, can therefore be designed with a significantly lower condensation capacity, and thus a smaller size. The cooling function of the condenser 15 is augmented by the expander 13, since the relaxation of the cathode waste gas taking place there cools it correspondingly (for example, from approximately 100° C. on the expander inlet side to approximately 80° on the expander outlet side).

Water condensed in the condenser 15 is fed by way of a water recirculation pipe 21, in which a pertaining water delivery pump 22 is arranged, into the anode circulating system 7. Such a water recovery is particularly expedient when the fuel cell 1 is a so-called direct methanol fuel cell (DMFC), in which a liquid water/methanol mixture circulates in the anode circulating system 7. The reason is that, in the case of such a DMFC, with each transfer of a methanol molecule through the fuel cell membrane, six molecules of water are also transferred from the anode to the cathode side. To eliminate an additional filling up with water, the water separated on the cathode side must be fed back into the anode circulating system 7, where it can be utilized in combination with the feeding of methanol to set a constant water/methanol ratio. In the illustrated case, the water is metered to the mixture flowing out of the anode space 2, which in this case consists of a water/methanol circulation composed of water, methanol and carbon dioxide gas, in front of the mouth of the fuel feed pipe 8.

When air is used as the oxygen containing gas, the residual gas which is not condensed out in the condenser 15, and which correspondingly consists of residual air, can be recirculated as required as enriched air by way of an optional gas recirculation pipe 23, indicated by a broken line, into the cathode feed pipe 9 on the suction side of the compressor 11.

Figure 2:
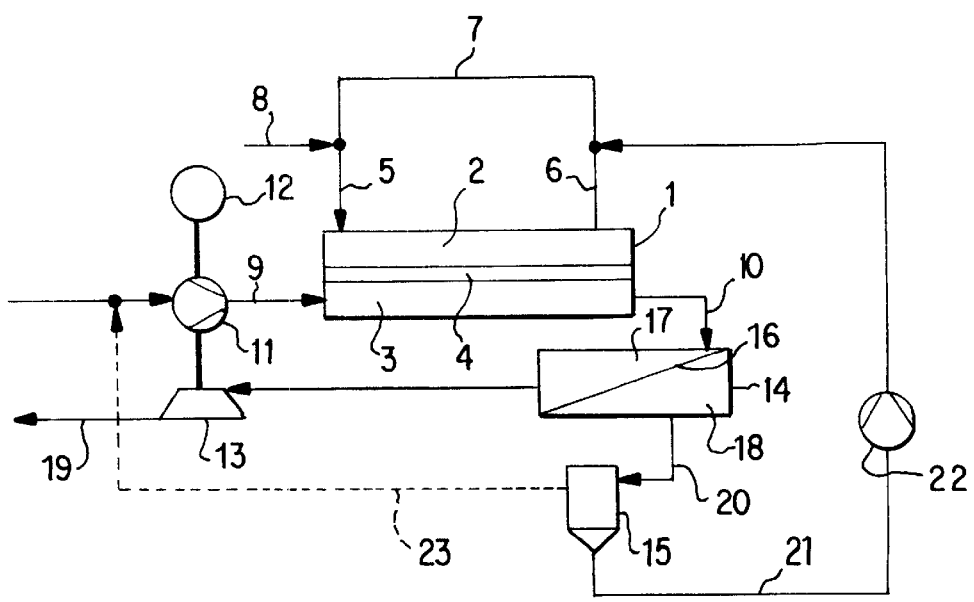
FIG. 2 is a block diagram of a fuel cell system according to the invention, with a water separating membrane unit arranged upstream of an expander.

The fuel cell system illustrated in FIG. 2 corresponds to that of FIG. 1 with the exception that the water separating membrane unit 14 with its mixture space 17 is arranged upstream and not downstream of the expander 13 in the cathode discharge pipe 10. Otherwise, the components and the construction of the system of FIG. 2 are identical to those of FIG. 1 so that, for reasons of clarity, the same reference numbers are used for corresponding elements and reference can be made to FIG. 1 with respect to their description. Due to the positioning of the water separating membrane unit 14 upstream with respect to the expander 13, excess pressure of the oxygen-containing gas generated by the compressor 11 in the cathode space 3 is present at the same level as in the mixture space 17 of the water separating membrane unit 14. Thus, in this embodiment, the pressure difference between the mixture space 17 and the water collecting space 18, which influences the water separating function of the water separating membrane 16 remains unaffected by the pressure reduction by the expander 13. On the other hand, the cooling function of the expander will now no longer contribute to the water condensation in the condenser.

It is understood that additional implementations of the fuel cell system according to the invention are conceivable. Thus, according to the application, the condenser, the water recirculating pipe and/or the expander of the systems illustrated in FIGS. 1 and 2 can be eliminated, or additional conventional system components can be included in the latter. Although, in the two illustrated embodiments, the water separating membrane unit and the condenser are illustrated as separate constructional units, it is also conceivable as an alternative to integrate these two components in a common constructional unit and, as a result, achieve a particularly compact construction. On the anode side, an anode circulation system must not necessarily be present, but a fuel feeding by way of the anode feed pipe and a product gas discharge by way of the anode discharge pipe may be sufficient. Instead of methanol, any other of the fuels known for this purpose, particularly hydrocarbons and hydrocarbon derivatives customary for this purpose, can also be used. Hydrogen, which can be generated, for example, in a hydrogen generating system connected on the input side, such as a methanol reforming system, can also be used as a gaseous fuel in this case. In addition, it is understood that the fuel cell system according to the invention can consist of a plurality of fuel cells which are appropriately wired with one another.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Fuel cell system, comprising:
    at least one fuel cell having an anode space with an inlet-side anode feed and an outlet-side anode discharge, and a cathode space with an inlet-side cathode feed and an oulet-side cathode discharge; and
    water separating devices arranged in the cathode discharge;
    wherein the water separating devices contain
    a water vapor separating membrane which selectively separates water vapor from residual cathode waste gas in the cathode descharge;
    a mixture space situated in the cathode discharge; and
    a water collecting space, said mixture space and said water collecting space being separated by said water separating membrane.

2. The fuel cell system according to claim 1, further comprising an expander arranged upstream or downstream of the water separating membrane unit in the cathode discharge.

3. The fuel cell system according to claim 1, further comprising a water recirculation pipe for recirculation of the water separated by the water separating membrane unit into the anode feed.

4. The fuel cell system according to claim 1, further comprising a condenser connected to the water collecting space.

5. The fuel cell system according to claim 4, further comprising a gas recirculation pipe leading from a gas outlet of the condenser to the cathode feed.

6. The fuel cell system according to claim 4, wherein the water separating membrane unit and the condenser are integrated in a common constructional unit.

* * * * *